(No Model.)

S. M. JONES.
COUPLING FOR RODS OR PIPES.

No. 543,183. Patented July 23, 1895.

Witnesses:
David C. Watter
L. E. Brown

Inventor:
Samuel M. Jones.
By Almous Hall
His Attorney.

UNITED STATES PATENT OFFICE.

SAMUEL M. JONES, OF TOLEDO, OHIO.

COUPLING FOR RODS OR PIPES.

SPECIFICATION forming part of Letters Patent No. 543,183, dated July 23, 1895.

Application filed November 16, 1894. Serial No. 528,990. (No model.)

*To all whom it may concern:*

Be it known that I, SAMUEL M. JONES, a citizen of the United States, residing at Toledo, Lucas county, Ohio, have invented certain new and useful Improvements in Couplings for Rods or Pipes, of which the following is a specification.

My invention relates to and its object is to provide a cheap, simple, and efficient means for coupling rods or pipes, and is designed more especially for use in joining the rods or pipes used to transmit motion from an engine to the working lever or walking-beam of pumps for oil-wells.

Figure 1:
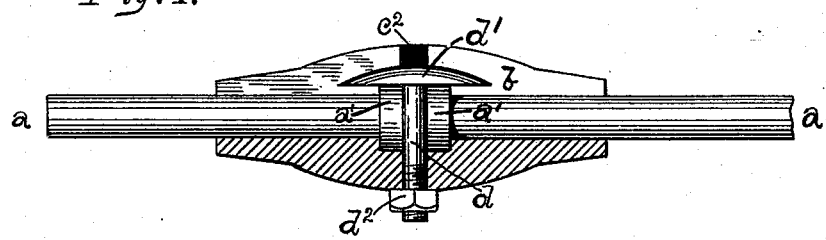
Figure 2:
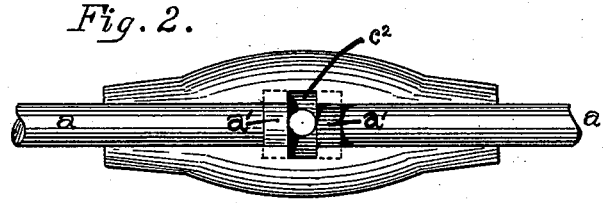
Figure 3:
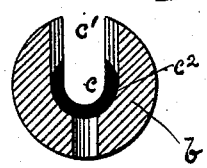
Figure 4:
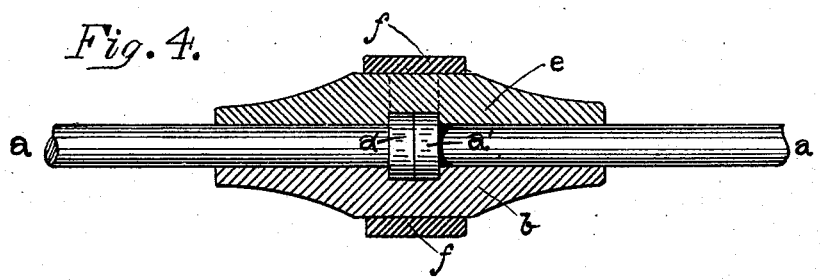
Figure 5:
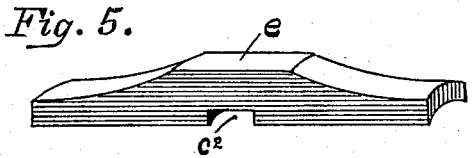

In the drawings, made part hereof, Figure 1 represents a longitudinal elevation of my device partly in section; Fig. 2, a plan view of the same with the bolt hereinafter referred to removed; Fig. 3, a central vertical cross-section of the sleeve hereinafter referred to; Fig. 4, a longitudinal vertical view of a modification of my device, partly in section; Fig. 5, a perspective view of a removable section of the coupling-sleeve hereinafter referred to, and Fig. 6 a central vertical cross-section of the modification of my device shown in Fig. 4.

Like letters of reference indicate like parts throughout the several views.

In the drawings, $a\ a$ represent sections of rod or pipe to be joined together and having at their meeting ends heads $a'$ formed integral with the rods or pipes.

$b$ is a sleeve or ferrule, preferably of malleable cast-iron, having a longitudinal axial bore $c$ of sufficient size to receive the rods or pipes to be coupled together. The sleeve or ferrule $b$ has also a slot $c'$ through the metal and extending its entire length, into and through which the rods or pipes $a$ may be slipped into bore $c$ sidewise. Midway of its length, as at $c^2$, bore $c$ is enlarged or chambered to receive heads $a'$, and the slot $c'$ is also enlarged midway of its length to permit the heads of the rods or tubes to be slipped sidewise into the chambered portion of the bore $c$.

In the example of my device shown in Figs. 1 and 2, the chambered portion $c^2$ of the bore $c$ is long enough to permit the heads $a'$ to be drawn slightly apart. Said heads may now be held in fixed relation to each other and to the sleeve or ferrule by inserting between them the shank of a common carriage-bolt $d$, having a head $d'$ narrow enough to permit it to drop into the slot $c'$. The extremity of the carriage-bolt extends through a hole in the sleeve provided for that purpose, and upon it is screwed a nut $d^2$. It will be seen, the heads of the rods having been slipped into place and having been drawn slightly apart, and the bolt $d$ having been inserted between the heads and secured in place by means of its nut $d^2$, that the rods $a$ are now held securely and rigidly against longitudinal or lateral movement.

Figure 6:
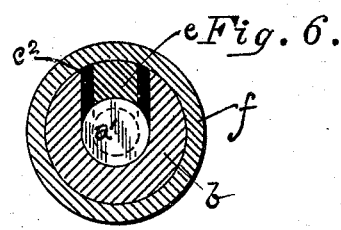

In the example of my device shown in Figs. 4, 5, and 6, I retain the headed rods or pipes $a$ and coupling-sleeve $b$, above referred to, said sleeve having the same axial bore and longitudinal slot as in the former instance; but in this modification of my invention the enlarged or chambered portion of the slot and bore are barely of sufficient width to receive the heads of the meeting ends of the rods or pipes $a$. The rods having been slipped into place with their heads in contact cannot be moved longitudinally, and to prevent their lateral movement or withdrawal from their seat I provide a sectional piece $e$, (shown in Fig. 5,) which conforms to the slot $c'$, and is shaped to complete exteriorly the uniform outline of the sleeve and interiorly its bore and chambered portion. The sectional piece $e$ is secured in place by means of a ring $f$, which is fitted tightly around the sleeve $b$ and its sectional piece $e$, as shown in Figs. 4 and 6. In practice the ring $f$ may be heated and driven upon the sleeve and made tight by cooling and shrinking in place.

What I claim as my invention, and desire to secure by Letters Patent, is—

A rod or pipe coupling, comprising rods or pipes having heads or enlarged portions at their meeting ends, a sleeve or ferrule having a slotted and chambered bore adapted to receive said pipes or rods and their heads, in combination with means for securing said pipe or rods within said chambered bore in fixed relation with said sleeve, substantially as and for the purpose specified.

SAMUEL M. JONES.

Witnesses:
FREDERICK L. GEDDES,
L. E. BROWN.